United States Patent [19]
von Fragstein et al.

[11] Patent Number: 6,074,738
[45] Date of Patent: Jun. 13, 2000

[54] FLEXIBLE WATER AND OIL RESISTANT COMPOSITES

[76] Inventors: Rainer von Fragstein, Karl-Wähmann-Str. 17, 83512 Wasserburg; Wolfgang Buerger, Böcklerweg 30, 81825 München; Rudolf Steffl, Sonnenmulde 34, 87466 Oy-Mittelberg; Wolfgang Zehnder, Schmiedweg 10, 85551 Kirchheim, all of Germany

[21] Appl. No.: 08/876,357

[22] Filed: Jun. 25, 1997

Related U.S. Application Data

[60] Provisional application No. 60/030,916, Nov. 14, 1996.

[30] Foreign Application Priority Data

Jun. 25, 1996 [DE] Germany ............... 196 25 389

[51] Int. Cl.$^7$ ..................................................... B32B 3/26
[52] U.S. Cl. .................................. 428/315.9; 428/315.5; 428/319.3; 428/422; 428/423.1; 428/523
[58] Field of Search ........................ 428/315.5, 315.9, 428/319.3, 422, 423.1, 523

[56] References Cited

U.S. PATENT DOCUMENTS

| | | | |
|---|---|---|---|
| 3,953,566 | 4/1976 | Gore | 264/288 |
| 4,194,041 | 3/1980 | Gore et al. | 428/315 |
| 4,228,975 | 10/1980 | Sealey | 244/102 R |
| 4,493,870 | 1/1985 | Vrouenraets et al. | 428/245 |
| 4,532,316 | 7/1985 | Henn | 528/59 |
| 4,725,481 | 2/1988 | Ostapchenko | 428/213 |
| 4,862,730 | 9/1989 | Crosby | 73/38 |
| 4,969,998 | 11/1990 | Henn | 210/490 |
| 5,116,650 | 5/1992 | Bowser | 428/34.2 |
| 5,209,850 | 5/1993 | Abayasekara et al. | 219/500.36 |
| 5,217,802 | 6/1993 | Scarmoutzos | 428/304.4 |
| 5,308,689 | 5/1994 | Shinkai et al. | 428/229 |
| 5,352,511 | 10/1994 | Abayasekara et al. | 428/308.4 |
| 5,354,587 | 10/1994 | Abayasekara | 428/36.6 |
| 5,460,872 | 10/1995 | Wu et al. | 428/304.4 |
| 5,539,072 | 7/1996 | Wu | 526/304 |

FOREIGN PATENT DOCUMENTS

| | | |
|---|---|---|
| 0 160 473 A2 | 11/1985 | European Pat. Off. . |
| 0 227 384 A2 | 7/1987 | European Pat. Off. . |
| 0 561 277 A1 | 9/1993 | European Pat. Off. . |
| 0 561 875 B1 | 9/1993 | European Pat. Off. . |
| 0 581 168 A1 | 2/1994 | European Pat. Off. . |
| 0 594 154 A1 | 4/1994 | European Pat. Off. . |
| 0 615 779 A1 | 9/1994 | European Pat. Off. . |
| 0 829 514 A2 | 3/1998 | European Pat. Off. . |
| 2925318 | 12/1983 | Germany . |
| 42 43 955 A1 | 12/1992 | Germany . |
| 4243955 | 6/1994 | Germany . |
| 91/01791 | 2/1991 | WIPO . |
| 92/10532 | 6/1992 | WIPO . |
| 92/21715 | 12/1992 | WIPO . |
| 95/26881 | 10/1995 | WIPO . |
| 95/32093 | 11/1995 | WIPO . |

*Primary Examiner*—Helen L. Pezzuto
*Attorney, Agent, or Firm*—Carol A. Lewis-White

[57] ABSTRACT

This invention provides air impermeable liquid-water resistant water-vapor-permeable composites that are highly oleophobic and some of which have enhanced water-vapor-permeable properties.

In its broadest aspect, the composites comprise: a layer of a microporous polymer that is water-vapor permeable and which is oleophobic, and which is liquid water-resistant. This layer is in contact with an air-impermeable, liquid water resistant, polymer layer that is permeable to water-vapor molecules. The oleophobic microporous polymer layer confers enhanced oleophobicity. In another aspect, a third layer of a microporous, water vapor permeable polymer can also be present on the other side of the air-impermeable polymer layer.

40 Claims, No Drawings

FLEXIBLE WATER AND OIL RESISTANT COMPOSITES

CROSS REFERENCE TO RELATED APPLICATIONS

This application is a regular application based on provisional application 60/030,916, filed Nov. 14, 1996.

FIELD OF THE INVENTION

The invention relates to flexible laminate composites which are especially suited for use for water resistant, but water vapor permeable textile materials, or apparel made from the materials.

BACKGROUND OF THE INVENTION

Materials for use for rainwear are known which have a layer of expanded microporous polytetrafluoroethylene (ePTFE) or porous polypropylene, see for example, Gore, et al., U.S. Pat. No. 4,194,041 or Henn, U.S. Pat. No. 4,969,998. Expanded microporous water-repellent polytetrafluoroethylene material described in Gore, U.S. Pat. No. 3,953,566 is especially well suited for this purpose. It is liquid water repelling, but allows water vapor, in the form of perspiration, to pass through. Polyurethanes and other polymers have been used for this purpose also. To confer good flexibility on the materials for use in the textile sector, the microporous layer should be made as thin as possible. However, a thinner membrane will generally mean a loss of performance, and thin coatings run the risk of decreasing water repellency.

U.S. Pat. No. 4,194,041 describes the use of an additional coating on microporous polymers which is based on a thin, air-impermeable coating composed of a polyetherpolyurethane or polyperfluorosulfonic acid that transports water vapor molecules by diffusion. The thin coating is employed to reduce transmission of surface active agents and contaminating substances through the polymers. Owing to the chemical structure of the polymer, this monolithic coating on the microporous structure exhibits a high transport of water molecules, (high permeability to water vapor) through the polymeric material. This film should be applied as thinly as possible in order not to affect the flexibility, yet confer adequate protection on the composite. Furthermore, water vapor permeability deteriorates greatly in the case of thicker, monolithic films.

Other coatings for microporous materials are described in the art. For example, EP 0581168 (Mitsubishi) describes the use of fluorinated alkyl methacrylate and fluorinated alkyl acrylate for polyolefin membranes. The substances are physically bound to the polymer matrix and contain a crosslinking monomer. The substance is applied in the form of a solution usually in fluorinated solvents. After coating, the solvent is removed. The situation is similar with a process for treating polymers with solutions of amorphous fluoropolymers (WO 92/10532).

Solutions of fluorine-containing polymers are also involved in a patent for coating ePTFE with Teflon AF (EP 0561875). WO 91/01791 (Gelman Sciences Technology; EP 0561277 (Millipore)/U.S. Pat. No. 5,217,802 propose treating a porous membrane with a fluorine-containing monomer and a crosslinker. The treatment is followed by polymerization. Perfluoropolyethers in conjunction with ePTFE for use as water-repellent finish are mentioned in WO 92/21715.

For improved water repellency performance, oleophobicized and hydrophobicized textile substrates sprayed with fluorocarbon emulsions are mentioned in EP 0594154.

A type of composite membrane is known from U.S. Pat. No. 4,969,998. In this membrane the material of the inner layer has in part penetrated into the pores of the microporous outer layer. As the material for the microporous outer layer, microporous expanded polytetrafluoroethylene, is proposed. As for the inner layer a polyether-polythioether is proposed. The latter material up to a certain degree fills the pores of the microporous layer, but is consistently tight, amorphous and nonporous. It is reported that this composite has moisture vapor transmission rates which are higher than the moisture vapor transmission rates of the laminate described first. However, when the composite was used as a textile laminate for rainwear it was found that under extreme athletic load and the associated heavy formation of perspiration, the latter cannot always be dissipated to the environment without residue. The liquid perspiration remaining on the inside of the clothing adversely affects the feeling of well being and comfort of wearing.

SUMMARY OF THE INVENTION

It is a purpose of this invention to provide flexible liquid water resistant, water vapor permeable composites having improved resistance to contaminants, especially to oil contaminants. The increased oleophobicity enhances the usefulness of the composites in garments and in separation applications.

It is another purpose of the invention to provide composites of enhanced moisture vapor transmission rate.

The composites of the invention are flexible, liquid water resistant, oleophobic, water-vapor permeable composites.

In its simplest and first embodiment, the composite is:

(a) a layer of a microporous polymer that is water-vapor permeable, oleophobic, and which is liquid water-resistant, said layer adhered to (b) an air-impermeable polymer layer that is water-vapor permeable.

The microporous polymer has voids throughout the internal structure which form an interconnected continuous air path from one side to another.

In one embodiment, the composite of the invention is composed of solely layers (a) and (b) as defined above.

In another second embodiment, a third layer, layer (c), of a microporous polymer can be present on the other side of the air-impermeable polymer layer. Layer (c) is also water vapor permeable. It can be made of the same polymer as used in layer (a) or it can be a different polymer. Preferably it is the same.

In a preferred aspect the microporous polymer layers are exemplified by a porous, expanded polytetrafluoroethylene (ePTFE) film.

In one instance in this second embodiment, membrane (c) may be hydrophobic. In another instance it may also be oleophobic. In another instance it may be made oleophobic. In still another instance it is hydrophilic.

Layer (a) is made oleophobic by treating it with an oleophobic polymer, such as, for example, a polymer that has recurring pendant fluorinated side chains. A trifluoromethyl group will be at the end of the recurring pendant alkyl-perfluoroalkyl groups which depend from the polymer backbone. Especially useful are polymers with an acrylate or methacrylate polymer backbone. In one aspect, the microporous film consists of ePTFE which is coated with a material that has perfluoroalkyl groups $CF_3-(CF_2)_n-$, where n is $\geq 0$, append from the polymer backbone.

In this latter instance, i.e., when layer (c) is hydrophilic, it has been found that when the composite containing this layer is used in a garment and this layer is innermost, the moisture vapor transmission rate is unexpectedly greater from the inside to the outside than the moisture vapor transmission rate of one of the other three-layer composites of the invention. This occurrence, which is surprising, may possibly be attributed to the fact that the moisture vapor transmission rate of the middle layer (b) increases in excess proportion when liquid water is present on the boundary surface. It may be that the microporous inner layer which has hydrophilic properties acts like a type of sponge and absorbs the perspiration which forms and distributes it over larger surface areas so that the individual water molecules on the boundary layer to the inner diffusion layer pass easily or in higher concentration into solution and thus migrate or diffuse more quickly to the outer side.

Microporous layer (c) can be rendered hydrophilic using known processes, for example using the process as is described in U.S. Pat. No. 5,209,850. Processes for rendering microporous polymers hydrophilic are described in two U.S. Pat. No. 5,352,511 and U.S. Pat. No. 5,354,587. DE-A 4243955 is also concerned with rendering initially water-repellent layers of fluoropolymers hydrophilic. Other treatment procedures are described below.

DETAILED DESCRIPTION OF THE INVENTION

Definitions

By "flexible" is meant easily bent, i.e., pliable.

By "liquid water resistant" is meant that the material is waterproof at a water pressure of 13.8 kN/m$^2$.

By "oleophobic" is meant a material has an oil resistance of 1 or more.

By "microporous" is meant a material has very small, microscopic voids throughout the internal structure which forms an interconnected continuous air path from one surface to the other.

By "air-impermeable" is meant that no airflow is observed for at least two minutes as determined by the Gurley test described below.

By "water vapor permeable" is meant an MVTR or at least 1000 g/m$^2$ per 24 hr, preferably 2000 g/m$^2$ per 24 hr.

By "hydrophilic" material is meant a porous material whose pores become filled with liquid water when subjected to liquid water without the application of pressure.

By "adhered" is meant layer to layer surface contact or impregnation, fully or partially, of layer (b) into the pores of layer (a), as well as adherence by use of an adhesive.

Suitable microporous polymers for layers (a) and (c) herein include fluoropolymers, e.g. polytetrafluoroethylene or polyvinylidene fluorides, polyolefins, e.g. polyethylene or polypropylene; polyamides; polyesters; polysulfone, poly (ethersulfone) and combinations thereof, polycarbonate, polyurethanes. To achieve flexibility, the layers should be thin.

If the microporous polymer of layer (a) is not naturally oleophobic, it can be rendered oleophobic by treating it with an oleophobic material. Usually application of oleophobic materials to the polymer is by applying a liquid form of the material, e.g., a melt, or solution or latex dispersion of the material, as, e.g. by dipping, painting, spraying, roller-coating or brushing the liquid on the surface. Application is carried out until internal surfaces of the microporous structure are coated, but not until the pores are filled as that would destroy or severely lessen the water-vapor transmitting property of the layer. Thus, the presence of the oleophobic polymer has little effect on the porosity; that is, the walls defining the voids in the microporous polymer preferably have only a very thin coating of the oleophobic polymer.

Application of the oleophobic material can be achieved by varying the concentration, solids content of the solution or dispersion, and/or by varying the application temperature, or pressure.

Common oleophobic compositions are oleophobic fluorocarbon compounds. For example, the fluorocarbon can be one that contains perfluoroalkyl groups $CF_3$—$(CF_2)_n$—, where n is $\geq 0$. The following compounds or classes of oleophobic materials can be used.

Apolar perfluoropolyethers having $CF_3$ side groups, such as Fomblin Y—Ausimont; Krytox—DuPont;

Mixtures of apolar perfluoroethers with polar monofunctional perfluoropolyethers PFPE (Fomblin and Galden MF grades available from Ausimont);

Polar water-insoluble PFPE such as, for example, Galden MF with phosphate, silane, or amide, end groups;

Mixtures of apolar PFPE with fluorinated alkyl methacrylates and fluorinated alkyl acrylate as monomer or in polymer form.

The above-mentioned compounds can be crosslinked by, for example, UV radiation in aqueous form solution or emulsion.

The following can also be used:

Microemulsions based on PFPE (see EP 0615779, Fomblin Fe20 microemulsions);

Emulsions based on copolymers of siloxanes and perfluoroalkyl-substituted (meth)acrylates (Hoechst);

Emulsions based on perfluorinated or partially fluorinated co- or terpolymers, one component containing at least hexafluoropropene or perfluoroalkyl vinyl ether;

Emulsions based on perfluoroalkyl-substituted poly (meth)acrylates and copolymers (products of Asahi Glass, Hoechst, DuPont and others).

Microemulsions based on perfluoroalkyl-substituted poly (meth)acrylates and copolymers (WU, U.S. Pat. No. 5,539,072; U.S. Pat. No. 5,460,872);

Complexes of polyelectrolytes and long-chain perfluorinated surfactants (see U.S. Pat. No. 4,228,975), compounds which can be used according to that reference with preference are: PFPE-COOH (perfluoropolyether with terminal carboxyl groups), perfluorocarboxylic acids, $CF_3$-$(CF_2)_n$—COOH n>6.

Perfluoroalkylsulfonic acids, e.g. $CF3$—$(CF_2)_n$—$SO_2OH$ n>6.

In one embodiment the coating comprises a solvent-free system of PFPE or a combination of various PFPEs.

It Is well known that—$(CF_2)_n$—$CF_3$ pendant groups impart very low surface energy values to the polymer and thus impart good oil and water resistance properties. Representative such oleophobic polymers can be made from organic monomers having pendant perfluoroalkyl groups. These include fluoroalkyl acrylates and fluoroalkyl methacrylates having terminal perfluoroalkyl groups of the formula:

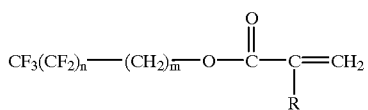

wherein n is a cardinal number of 1–21, m is a cardinal number of 1–10, and R is H or $CH_3$; fluoroalkyl aryl urethanes, for example

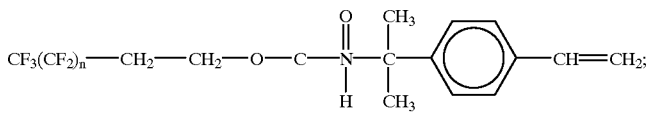

fluoroalkyl allyl urethanes, for example

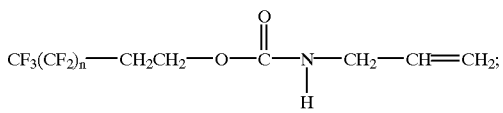

fluoroalkyl urethane acrylates; fluoroalkyl acrylamides; fluoroalkyl sulfonamide acrylates and the like.

It is understood that in the perfluorinated alkyl end group $CF_3(CF_2)_n$, it is difficult to prepare a compound in which n is a single numeral and that the end group is commonly a mixture of groups having varying chain lengths in which n is a mixture of predominantly 5, 7, 9.

These polymers and their preparation are known in the art.

In a preferred aspect, these oleophobic polymers are delivered from an aqueous latex in which the diameter of the polymer particles are in the nanoparticle range, 0.01 to 0.5 micrometer. Such particles prepared from microemulsions are described e.g., in Wu, U.S. Pat. No. 5,539,072 and Wu, U.S. Pat. No. 5,460,872.

The air-impermeable polymer layer (b) is water-vapor permeable and transports individual water molecules across its molecular structure. This phenomenon is well known. But because of its nature, the bulk transport of liquids and gases is inhibited. The layer is very thin and serves as support and barrier layer. The (b) layer can be for example polyurethane, or a copolyether, copolyester or a silicone. In these polymers, especially polyurethanes, passage of water vapor molecules is facilitated by presence of repeating oxyethylene units:

in the polymer chain. Polyurethanes of this nature are described in Henn, U.S. Pat. No. 4,532,316 as well as Gore, U.S. Pat. No. 4,194,041 and U.S. Pat. No. 4,942,214. The amount of the ethylene oxide units can vary greatly, e.g., from over 70% to as little as 10%. Copolyethers and copolyetheresters, such as those described in U.S. Pat. No. 4,725,481 and U.S. Pat. No. 4,493,870 are also useful. Also useful are polyethyleneimines, polyoxyethyleneamines, polyoxypropylene amines, and polyvinylamines, polyacrylics. Also useful are closed cell foams of such polymers.

The air-impermeable polymer layer (b) is combined with the oleophobic polymer layer (a) by any one of several methods. The air-impermeable polymer can be applied in liquid form from a liquid mixture or can be applied in solid sheet form. If the polymer is in sheet form, it can be laminated to the oleophobic membrane by passing the sheets through nip rolls or using a breathable adhesive. Alternatively, the microporous polymer material and the air-impermeable polymer can be combined before the oleophobic material is applied. In this variation, the microporous polymer layer can be treated by brushing or coating by any other conventional means, including spraying or roll coating or the like. A convenient polymer for layer (b) is a water-vapor permeable air-impermeable polyurethane, such as Hypol® 2000. It can be applied pre-crosslinked or can be crosslinked after application.

Materials that can be used to treat the microporous polymers to make them hydrophilic to make them useful as layer (c) include: aqueous, alcoholic or aqueous/alcoholic solutions of a copolymer of tetrafluoroethylene and vinylacetate, polyacrylic acid and copolymers thereof, polyacrylamide and copolymers thereof, polyvinyl acetate (PVA), polystyrenesulfonate; polyethylene-, or propylene glycols (PEG, PPG), hydrophilic silicones; anionic, cationic, nonionic or amphoteric surface active agents or mixtures, and complexes of the above. Treatment with hydrophilic material is accomplished by the same technique described above for treatment with oleophobic materials.

The methods of preparation of the three-layer composites, i.e., where layer (c) is present, is the same. Microporous layer (c) can be pretreated to render it oleophobic or hydrophilic, as the case may be. This can be done before the layer is affixed or after, as described above.

In one method to produce a triple-ply composite, the pre-crosslinked polyurethane resin with curing agent is applied to a first film of ePTFE by means of a roll coater. The coating weight can, for example, be 10 g/m². Then another microporous ePTFE layer is applied and the layers joined in this way are routed through a gap between the two pressure rolls so that not yet completely crosslinked resin is pressed to a certain degree into the microporous structure and penetrates into the pores. The polyurethane resin can however be adhered or laminated as a finished film to one of the layers first, as is described, for example, in DE-PS2925318. Then one layer (layer (a)) of microporous film is rendered oil-repellent. The other layer can then be rendered hydrophilic or oleophobic by treatment described above; or can remain untreated.

The layer thicknesses, densities and pore sizes of the ePTFE layers used can vary, depending on the application.

The composites of the invention can be laminated to fabrics on one or both sides and the resulting material used to make waterproof but water-vapor permeable garments.

The composite can be used in conjunction with rainwear and athletic clothing. Of course the composite can also be used in other industrial applications, where it can be used to remove molecules of low molecular weight from solutions, in distillation, sewage concentration, concentration of juices or biological systems or also in dialysis applications. The prerequisites for this application are the selective diffusion behavior of the middle layer which must have higher solubility for the passing molecules than for the other molecules of the mixture to be concentrated.

In the embodiment in which layer (c) is hydrophilic, the composite is advantageous in that presence of pin holes, etc., does not lead to leaks. Water penetrating via a hole on the inside, i.e., the side facing the body of the wearer, will first form a drop. This drop, however, will again be transported into this inner layer by capillary forces and transported to the middle layer (b). On this surface, the water is distributed over the surface and is "transferred" as vapor from there to the outside.

TEST PROCEDURES

Air Permeability/Impermeability—Gurley Number Test

Gurley numbers were obtained as follows:

The resistance of samples to air flow was measured by a Gurley densometer (ASTM D726-58) manufactured by W. & L. E. Gurley & Sons. The results are reported in terms of Gurley Number which is the time in seconds for 100 cubic centimeters of air to pass through 6.54 cm$^2$ of a test sample at a pressure drop of 1.215 kN/m$^2$ of water. A material is air-impermeable if no air passage is observed over 120 second interval.

Oil Repellency Test

In these tests, oil rating was measured using the AATCC Test Method 118-1983 when testing film composites. The oil rating of a film composite is the lower of the two ratings obtained when testing the two sides of the composite. The higher the number, the better the oil repellency. A value of greater than 1, preferably 2 or more, more preferably 4 or more, is preferred.

The test is modified as follows when testing laminates of the film composite with a textile. Three drops of the test oil are placed on the textile surface. A glass plate is placed directly on top of the oil drops. After 3 minutes, the reverse side of the laminate is inspected for a change in appearance indicating penetration or staining by the test oil. The oil rating of the laminate corresponds to the highest number oil that does not wet through the laminate or cause visible staining from the reverse side of oil exposure. The higher the number, the better the oil repellency. A value of greater than 1, preferably 2 or more, more preferably 4 or more, and most preferably, 6 or more, is preferred.

Moisture Vapor Transmission Rate Test (MVTR)—Method A

In this procedure, approximately 70 ml of a solution consisting of 35 parts by weight of potassium acetate and 15 parts by weight of distilled water was placed into a 133 ml polypropylene cup, having an inside diameter of 6.5 cm at its mount. An expanded polytetrafluoroethylene (PTFE) film having a minimum MVTR of approximately 60,000 g/m$^2$ per 24 hours as tested by the method described in U.S. Pat. No. 4,862,730 to Crosby using potassium acetate and available from W. L. Gore & Associates, Inc. of Newark, Del. was heat sealed to the lip of the cup to create a taut, leakproof, microporous barrier containing the solution. A similar expanded PTFE film was mounted to the surface of a water bath. The water bath assembly was controlled at 23° C., plus or minus 0.2° C., utilizing a temperature controlled roll and a water circulating bath. The sample to be tested was allowed to condition at a temperature of 23° C. and a relative humidity of 50% prior to performing the test procedure. Samples were placed so the microporous polymeric film to be tested was in contact with the expanded polytetrafluoroethylene film mounted to the surface of the water bath and an equilibration of at least 15 minutes was used for laminates with textiles and at least 10 minutes for film composites, prior to the introduction of the cup assembly. The cup assembly was weighed to the nearest 1/1000 g and was placed in an inverted manner onto the center of the test sample. Water transport was provided by the driving force between the water in the water bath and the saturated salt solution providing water flux by diffusion in that direction. The sample was tested for 15 minutes and the cup assembly was then removed and weighed again. The MVTR is calculated from the weight gain of the cup assembly and expressed in gm of water per square meter of sample surface area per 24 hours.

Moisture Vapor Transmission Rate Test (MVTR)—Method B

This method is same as Method A except that the sample rests directly on the water, i.e., there is no PTFE film mounted to the surface of the water bath.

EXAMPLE 1

An oleophobic expanded microporous polytetrafluoroethylene (PTFE) film was prepared by coating an expanded microporous polytetrafluoroethylene (PTFE) film provided by W. L. Gore & Associates, Inc. The film prior to coating had a nominal pore size of 0.2 micron and a weight of about 23 g/m2 and thickness of about 65 micrometer and a Gurley number of 7.5 sec.

The film was rendered oleophobic by treating it with an aqueous latex of an organic polymer having pendant perfluoroalkyl side chains obtained from W. L. Gore &Associates, Inc. prepared based on Example 1B in U.S. Pat. No. 5,539,072 (incorporated herein by reference) such that the oil rating of 8 was measured for the film after coating and subsequently drying at 200° C. The Gurley number was 14 sec, indicating that the pores were still open. The now oleophobic film was coated with a water-vapor permeable, Hypol® 2000 (W. R. Grace & Co.) prepolymer with curing agent of hexamethylene diamine to yield a composite of the first embodiment of the invention. The composite readily transmitted moisture but was impermeable to air. The composite was tested for moisture vapor transmission rate and oil repellency: The MVTR was 11,000 g/m$^2$ per 24 hrs and the oil rating measured on the side of the film away from the air-impermeable polymer layer was 8.

In the Gurley test, no air flow was observed, demonstrating that a completely air-impermeable polyurethane coating was applied.

The composite was spotwise adhered to a polyester fabric. The film composite was positioned such that the continuous polyurethane layer faced away from the fabric. An MVTR using Method A of 11,000 g/m$^2$ per 24 hr was measured for this laminate when the polyurethane layer was towards the water.

In contrast, the MVTR of a composite of the expanded microporous polytetrafluoroethylene coated with the Hypol® 2000, but which was not treated with the aqueous latex of the organic polymer had an oil rating of zero. The MVTR was 14,230 determined by Method A.

EXAMPLE 2

An oleophobic expanded microporous polytetrafluoroethylene (PTFE) film was prepared by coating an expanded microporous polytetrafluoroethylene (PTFE) film provided by W. L. Gore & Associates, Inc. The film prior to coating had a nominal pore size of 0.2 micron and a weight of about 23 g/m2 and thickness of about 65 micrometer and a Gurley number of 7.5 sec. The membrane was rendered oleophobic by treating it with an aqueous latex of an organic polymer having pendant perfluoroalkyl side chains obtained from W. L. Gore & Associates, Inc. prepared based on Example 1B in U.S. Pat. No. 5,539,072 such that the oil rating of 8 was measured for film after coating and subsequently drying at 200° C. The Gurley number was 14 seconds.

Two separate layers of the coated film were then bonded together with the Hypol® 2000 prepolymer by simultaneously passing the two layers through a nip roll with the Hypol® 2000 prepolymer between the layers. Pressure on the nip forced a portion of the Hypol 2000® prepolymer to penetrate both layers of the coated film. The composite structure was then allowed to moisture cure. The oleophobic composite structure thus produced, readily transmits moisture but is impermeable to air. The composite structure when tested for oil repellency had a repellency of 8 measured on both sides of the composite structure. No air flow was observed using the Gurley test.

The lack of air permeability indicates that a completely air-impermeable polymer coating was applied. The MVTR of the composite using Method A was 7,000 g/m² per 24 hr.

EXAMPLE 3

An oleophobic material, Galden MF 201 (Ausimont), a mono and bis trifluoromethyl-poly-oxyperfluoroalkylene-methylene polyoxyethylene-phosphate of average mol. weight of 850 g/mol, which contains phosphate groups, is polar and is of highly viscous to waxy consistency at room temperature. It was heated to 50–70° C. and applied by roll coating using a heated roll to one side of an expanded polytetrafluoroethylene microporous film coated with a water vapor permeable (breathable) polyurethane prepolymer of MDI and an alkylene oxide described in U.S. Pat. No. 4,942,214. The Galden coating weight is adjusted via nip settings and roller pressures so that an add-on of 1.0±0.2 g/m² is achieved. The Galden coating is applied to the side opposite the polyurethane coating.

To homogenize and heat-set the coating, the coating step is followed by heating in a continuous oven at 150–170° C. for a residence time of 0.5–5 minutes.

The oil rating, determined on the MF201-coated side, is 4. The MVTR using Method A is 22,000 g/m² per 24 hr. The chemical stability or permanence is assessed by performing wash tests at 60° C. The composite is still oleophobic after washing.

EXAMPLE 4

Example 3 was repeated except the coating weight was 2±0.3 g/m² instead of 1±0.2 g/m². Coating material, thermal treatment and coating technology were unchanged.

The oil rating on the MF201-coated side was 6. The MVTR using Method A was 20,500 g/m² per 24 hr. The chemical stability or permanence was determined by performing wash tests at 60° C. The composite was still oleophobic after washing or after dry cleaning with perchloroethylene.

EXAMPLE 5

Coating material, thermal treatment and coating procedure were as in Example 3 except that the coating weight was 5±1 g/m². The oil rating on the MF201-coated side was 7. The MVTR using Method A was 19,000 g/m² per 24 hr. The material retained oleophobicity after washing.

EXAMPLE 6 a) a mixture of an oleophobic apolar polyfluoropholyether (Fomblin VAC 25/6) mol wt 3300 g/mol, Ausimont Spa, Italy) with Galden MF201 in mixing ratio of 65% MF201 and 35% of the Fomblin were used. Coating and thermal treatment were as in Example 3. Coating weight was 2±0.2 g/m². Oil value was 4 on the coated side. MVTR was 20,000 g/m² per 24 hr.

b) Part a) was repeated except that the mixing ratio was adjusted to 80% of MF201 and 20% of the Fomblin. The coating weight was determined by weighing to be 2±0.2 g/m². The oil rating on the side coated with PFPE mixture was 6. The MVTR using Method A was 19,000 g/m² per 24 hr.

The material retained its oleophobicity after washing.

Fomblin VAC 25/6 is 1-propene, 1,1,2,3,3,3 hexafluoro-oxidized, polymerized, Mw 3300 g/mol.

EXAMPLE 7

A process for the oleophobilization of an ePTFE composite membrane coated with a breathable polyurethane was carried out with the following treatment steps:

The porous side (see Example 3) of the material was wetted with 1:2 isopropanol/water.

A polyelectrolyte solution (see table below) was applied by roll coating. This was followed by the application of an aqueous fluoro surfactant solution, squeezing off, drying and heat setting the material at 150° C.

The results are presented in the table.

| Polyelectrolyte | Fluoro surfactant (% by Weight) | Oil value |
| --- | --- | --- |
| Polyallylamine (PAA) (0.1N) (Aldrich Chemical Company, Inc. | 5% strength FC 99 (3M | >2 |
| PAA (0.1N) | Fe20 AG (Ausimont) | >2 |
| Polyethyleneamine (PEI) (0.1N) G100 | 5% strength FC 99 (3M) | >2 |
| G100 (0.1N) | Fe20 AG (Ausimont) | >2 |

EXAMPLE 8

The coating material used was a polysiloxane having fluorinated side chains (Nuva 4190, Hoechst) in a mixing ratio 20% of Nuva/80% isopropanol. Coating technology and thermal treatment were carried out as described in Example 3. The coating weight is 2.5±0.2 g/m². The oil rating on the coated side was 6. The MVTR using Method A was 19,000 g/m² per 24 hr.

EXAMPLE 9

A microemulsion FE 20 AG (Ausimont), which has a low viscosity at room temperature, was roll-coated onto the microporous polymer side of a composite of expanded PTFE and the polyurethane described in Example 3. The coating weight was adjusted via nip settings and roller pressures so that an add-on of 2.0±0.2 g/m² was achieved.

Fe20AG is a Fomblin microemulsion in water, density 1.16 g/ml at 25° C. and consists of Galden MF 310 neutralized with ammonia; and Galden MF 3100, a trifluoromethyl-polyoxyperfluoroalkylene-methylene carboxylic acid.

To homogenize and heat-set the coating, the coating step was followed by treating the film in a continuous oven at 150–170° for a residence time of the coated material of 5 minutes. The results were an MVTR value of 17,500 g/m² per 24 hr using Method A and an oil rating of >2.

EXAMPLE 10

The coating material used was perfluoropolyether Fomblin Y VAC 06/6 (Mw 1800 g/mol, Ausimont).

The perfluoropolyether was applied to the microporous film side (substrate similar to Example 3) by guiding the film over a coating roll at a linear speed of 40–60 m/min. To achieve the necessary coating viscosity, the rolls are heated to 50–70° C. The applied coating is subsequently homogenized in a continuous oven at 130° C. in the course of a residence time of 12 to 18 sec. The add-on was 3.5±0.5 g/m². A scanning electron micrograph of the coated microporous structure shows that only the inner surface of the structure is coated. The water vapor permeability, expressed as the MVTR using Method A, was 18,500 g/m² per 24 hr, The oil rating on the membrane side coated with perfluoropolyethers is 2.

The material produced was used to produce textile composite layers (composites, textile laminates) as 2- and 3-ply laminates by bonding textile sheet materials composed of polyester or polyamide on one or both sides to the membrane by spotwise adhesion.

Laminates can also be produced using Fomblin Y VAC 16/6 (Mw 2800 g/mol, Ausimont).

EXAMPLE 11

A composite was prepared by laminating together two expanded microporous polytetrafluoroethylene (PTFE) films provided by W. L. Gore & Associates, Inc. The two PTFE films had a nominal pore size of 0.25 µm, a weight of about 20 g/m² and a thickness of 40 µm. For lamination a water-vapor-permeable polyurethane resin (PUR) as described in Example 3 was applied and partially penetrated into the microporous structure of the first film using a roll coating device, then the second film was laminated using the PUR as the adhesive between two nip rolls. After moisture curing of the PUR at room temperature, the above mentioned laminated film was coated on one side with Galden MF201 (Ausimont) as described in Example 3. In the next step, the other side was coated with the polymer solution described in U.S. Pat. No. 5,209,850 to render the microporous PTFE hydrophilic (laydown=4 g/m²). After drying, the resulting composite turned clear on one side after immersion in water.

The moisture vapor transmission rate for this composite was measured by Method B by first facing the oleophobic side, then the hydrophilic side of the membrane towards the water.

MVTR measured by Method B shows 25,000 g/m² per 24 hr for the side treated with Galden MF and 71,000 g/m² 24 hr for the hydrophilic side facing the water.

EXAMPLE 12

A composite was prepared as in Example 11 with one side coated with Galden MF201. This composite was laminated on the Galden treated side to a 120 g/m² polyester textile using a spot wise adhesion process. After lamination, the untreated side was coated with the polymer described in U.S. Pat. No. 5,209,850 as in Example 11.

MVTR measured with Method B shows 7200 g/m² per 24 hr for textile side facing the water and 21,500 g/m² per 24 hr for the hydrophilic film side facing the water.

EXAMPLE 13

A composite was prepared as in Example 11, except that for hydrophilic treating, a commercial available antifogging spray (Nigrin Anti Fogging Spray, Inter-Union Technohandel Landau) was applied on one side. MVTR measured with Method B shows 27,000 g/m² per 24 hr for the untreated and 79,000 g/m² per 24 hr for the hydrophilic side facing the water.

We claim:

1. A composite comprising:
   a). a layer of a water-vapor-permeable, microporous structure comprising a microporous polymer that has a coating on at least a portion of the pore walls of the microporous polymer, of a second polymer that imparts greater oleophobicity to the microporous polymer; said layer adhered to
   b). a layer of an air-impermeable third polymer that is water-vapor-permeable.
2. The composite of claim 1 laminated to a textile on one or both sides.
3. The composite of claim 1 wherein the microporous polymer is expanded polytetrafluoroethylene.
4. The composite of claim 3 where layer (b) is a polyurethane.
5. The composite of claim 1 wherein the composite has an oil rating of at least 2.
6. The composite of claim 1 wherein the composite has an oil rating of at least 4.
7. The composite of claim 1 wherein the oil rating of the composite is at least 6.
8. The composite of claim 1 wherein the oil rating of the composite is at least 8.
9. The composite of claim 1 wherein the microporous structure is liquid-water-resistant.
10. A composite comprising:
    a). a layer of a water-vapor-permeable microporous structure comprising a microporous polymer that has a coating on at least a portion of the pore walls of the microporous polymer, of a second polymer that imparts greater oleophobicity to the microporous polymer; said layer adhered to
    b). a layer of an air-impermeable third polymer that is water-vapor-permeable;
    c). a layer of a fourth polymer on the side of layer b) opposite layer a), that is a microporous polymer which is water-vapor-permeable.
11. The composite of claim 10 laminated to a textile on one or both sides.
12. The composite of claim 10 wherein the microporous polymer of part a) and c) is expanded polytetrafluoroethylene.
13. The composite of claim 10 where layer b) is a polyurethane.
14. The composite of claim 10 wherein the composite has an oil rating of at least 2.
15. The composite of claim 10 wherein the composite has an oil rating of at least 4.
16. The composite of claim 10 wherein the oil rating of the composite is at least 6.
17. The composite of claim 10 wherein the oil rating of the composite is at least 8.
18. The composite of claim 10 wherein the microporous structure is liquid-water-resistant.
19. A composite comprising:
    a). a layer of a water-vapor-permeable microporous structure comprising a microporous polymer that has a coating on at least a portion of the pore walls of the microporous polymer, of a second polymer that imparts greater oleophobicity to the microporous polymer; said layer a) adhered to
    b). a layer of an air-impermeable third polymer that is water-vapor-permeable;
    c). a layer of a fourth polymer on the side of layer b) opposite layer a) that has a microporous structure comprising a microporous polymer that has a coating on at least a portion of the pore walls of the microporous polymer, of a polymer that imparts greater oleophobicity to the microporous polymer of this part c).

20. The composite of claim 19 laminated to a textile on one or both sides.

21. The composite of claim 19 wherein the microporous polymer of part a) and c) is expanded polytetrafluoroethylene.

22. The composite of claim 19 where layer b) is a polyurethane.

23. The composite of claim 19 wherein the composite has an oil rating of at least 2.

24. The composite of claim 19 wherein the composite has an oil rating of at least 4.

25. The composite of claim 19 wherein the oil rating of the composite is at least 6.

26. The composite of claim 19 wherein the oil rating of the composite is at least 8.

27. The composite of claim 19 wherein the microporous structures are liquid-water-resistant.

28. A composite comprising:
 a). a layer of a water-vapor-permeable microporous structure comprising a microporous polymer that has a coating on at least a portion of the pore walls of the microporous polymer, of a second polymer that imparts greater oleophobicity to the microporous polymer;
 b). a layer of an air-impermeable third polymer that is water-vapor-permeable and which penetrates at least partially into the pores of the microporous polymer.

29. The composite of claim 28 laminated to a textile on one or both sides.

30. The composite of claim 28 wherein the microporous polymer of part a) is expanded polytetrafluoroethylene.

31. The composite of claim 28 where layer b) is a polyurethane.

32. The composite of claim 28 wherein the composite has an oil rating of at least 2.

33. The composite of claim 28 wherein the composite has an oil rating of at least 4.

34. The composite of claim 28 wherein the oil rating of the composite is at least 6.

35. The composite of claim 28 wherein the oil rating of the composite is at least 8.

36. The composite of claim 28 wherein the microporous structure is liquid-water-resistant.

37. A composite comprising:
 a). a layer of a structure comprising expanded polytetrafluoroethylene having pores, at least a portion of the pore walls having a coating of a second polymer that imparts greater oleophobicity to the polytetrafluoroethylene;
 b). a layer of an air-impermeable polyurethane that is water-vapor permeable.

38. The composite of claim 37 wherein a layer c) is present that is another layer of expanded polytetrafluoroethylene.

39. The composite of claim 37 wherein a layer c) is present that is expanded porous polytetrafluoroethylene having pores, at least a portion of the pore walls having a coating of a second polymer that imparts greater oleophobicity to the polytetrafluoroethylene.

40. Apparel including the composite of claim 1, 10, 19, 28, 37, 38 or 39.

* * * * *